F. GUY.
ACETYLENE LAMP.
APPLICATION FILED JULY 21, 1913.

1,199,267.

Patented Sept. 26, 1916.

Witnesses.
J. A. Boyce.

Inventor.
FRANK GUY.
by Atty N. DuBois.

UNITED STATES PATENT OFFICE.

FRANK GUY, OF SPRINGFIELD, ILLINOIS.

ACETYLENE-LAMP.

1,199,267.  Specification of Letters Patent.  Patented Sept. 26, 1916.

Application filed July 21, 1913. Serial No. 780,274.

*To all whom it may concern:*

Be it known that I, FRANK GUY, a citizen of the United States, residing at Springfield, in the county of Sangamon and State of Illinois, have invented a new and useful Acetylene-Lamp, of which the following is a specification.

This invention relates to lamps for generating and burning acetylene gas.

The invention is illustrated in the annexed drawings.

I have shown and will hereinafter describe the invention as applied to a miner's lamp, but it is obviously equally applicable to other lamps.

The purpose of the invention is to provide a generator comprising variable distributing means effective to distribute water evenly over a relatively large area of the mass of carbid contained in the generator, to cause constant and even generation of gas, also effective to prevent the passing of gas from the carbid box into the water reservoir and thence to the atmosphere and thus going to waste, and also effective to control the pressure of gas at the burner to suit different conditions of use.

Figure 1:
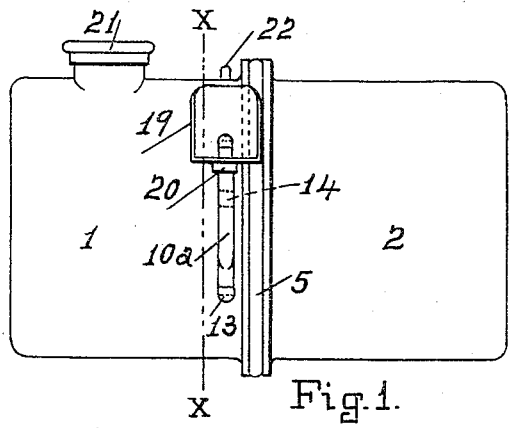
Figure 4:
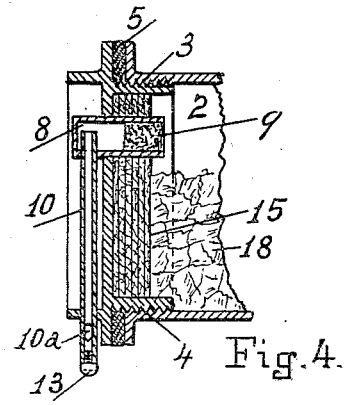
Figure 2:
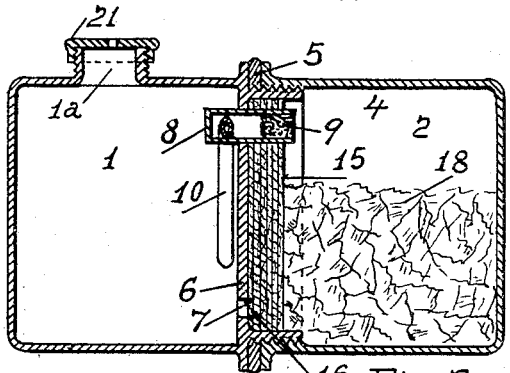
Figure 6:
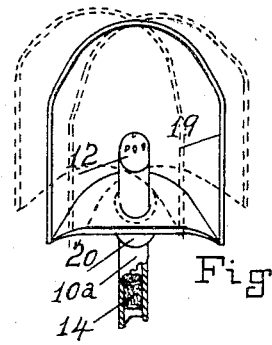
Figure 3:
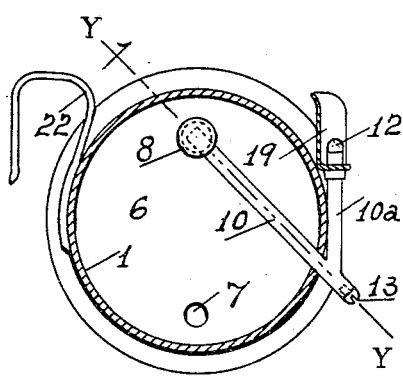
Figure 5:
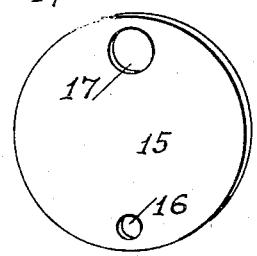

Figure 1 is a front elevation of the lamp. Fig. 2 is a vertical axial section through the lamp. Fig. 3 is a vertical transverse section on the line X. X of Fig. 1. Fig. 4 is an enlarged oblique section on the line Y. Y. of Fig. 3. Fig. 5 is an isometric view of one distributing disk and Fig. 6 is an enlarged isometric view of the flame protector.

Similar reference characters designate like parts in the different views.

The body of the lamp may be of any suitable material but sheet metal is preferably used on account of its lightness and the facility with which it may be worked.

A cylindrical water reservoir 1 and a cylindrical carbid box 2 are connected together by a male screw 3 on the reservoir and a female screw 4 on the box; a rubber gasket 5 forms a gas tight joint at the juncture of the box with the reservoir.

The lamp body as a whole is preferably in the form of a horizontal cylinder, but it is obvious that a polygonal lamp-body may be used without departure from my invention. A practical advantage of the horizontal cylindrical structure is that a horizontal lamp will occupy less vertical space than a vertical lamp of the same capacity and being supported horizontally on the vizor of the miner's cap will not be subject to the tilting and excessive oscillation which is an objection common to all vertical miners' lamps.

A diaphragm 6 is stationary within the reservoir. A hole 7 permits water to flow from the reservoir into the box. A drum 8 is stationary on the diaphragm. One end of the drum is closed and the open end of the drum is in communication with the carbid box above the mass of carbid contained therein. A filter 9 of felt or other suitable material filters the gas entering the drum. A tube 10 communicates with the interior of the drum, and has a branch 10$^a$. A lava burner 12 is detachably mounted in the upper end of the tube 10$^a$. A screw 13 at the lower end of the tube 10 controls access to the inside of the tubes 10 and 10$^a$.

The gas-supply and drainage tube 10 is inclined downwardly from the drum 8 in order that any water or dirt entering the tube may pass downward in the tube and be deposited in that part of the tube which is below the lower end of the branch tube 10$^a$. The tube 10$^a$ is inclined upwardly from the tube 10 in order that any water remaining in the gas may drain into the tube 10 before the gas reaches the burner 12.

In practice it is found that if an acetylene gas lamp be used in a mine in the vicinity of a shot which is being fired the concussion of the air caused by the explosion will produce such backward flow of the gas from the burner into the burner tube as will for an instant stop the flow of gas through the burner and thus extinguish the flame. To overcome this difficulty a barrier 14 of felt or other fibrous material is placed in the tube 10$^a$ a short distance below the inner end of the burner 12. The barrier is of a nature to permit a gradual outward flow of gas through the barrier and is effective to prevent any sudden reaction of the gas which is in the tube above the barrier and serves to impede the backward flow of gas from the burner into the tube; to such extent as to counteract the force of the concussions of shot firing and thereby prevent the extinguishing of the flame. The barrier is designed for occasional use and may be removed when it is not needed. To insert the barrier the burner 12 will be removed and the barrier will be pushed downward into the tube. To remove the barrier the screw 13 and the burner 12 will be detached and a wire, or other suitable instrument, will be inserted in the lower end of the tube 10 and pushed upward through the tube 10ª.

A plurality of absorbent distributers 15, preferably in the form of disks, are placed one against the other, one face of the inner distributer being in close contact with one face of the diaphragm 6.

One of the distributers has a hole 16 positioned to register with the hole 7 of the diaphragm, and all the distributers have holes 17 adapted to accommodate the drum 8. The hole 16 in the first distributer of the series admits water in direct contact with the second distributer and the diffusion of water between the two distributers is better than it would be between the face of the diaphragm and the first distributer.

I prefer to use distributers of blotting paper because that material is not costly, is durable and gives very uniform diffusion of the water; but distributers of other suitable material obviously may be used without departure from my invention.

In practice the calcium carbid 18 will occupy about half of the space in the box 2, and about half of the outer surface of the outer distributer 15 will be in contact with the mass of carbid and the capillary distributers in conjunction with the absorbent carbid will cause gradual and even diffusion of the water through the mass of carbid so that there will be continuous and even generating of gas until the entire mass of carbid is consumed.

The associated distributers constitute a barrier between the water in the reservoir and the gas in the carbid box and the adding of a distributer or distributers augments the barrier and thereby increases the resistance to the flow of gas from the carbid box into reservoir, resulting in the accumulation of a greater quantity of gas in the carbid box and consequent rise in pressure, and when the barrier becomes saturated it more strongly opposes the passing of the gas through the barrier, resulting in a corresponding increase of the pressure of gas in the carbid box.

In practice it is found that blotting paper distributers give quick and even distribution of water and are not easily injured or destroyed by the carbid. Water in contact with one distributer is readily diffused through all the distributers of the series.

When the lamp is charged for use the action may be explained as follows: The first distributer is in contact with the diaphragm and has an opening 16 through which the water comes in direct contact with the second distributer and with the edge of the opening in the first distributer, both distributers quickly absorb water until they become saturated and the water from the second distributer is uniformly diffused through the other distributers of the series. The outer surface of the last distributer of the series is in close contact with the vertical end wall of the mass of carbid in the box so the water is uniformly applied over the entire area of the end wall of the mass of carbid and is absorbed thereby, to effect a substantially constant generation of gas, until the carbid is exhausted.

It is found advantageous to use four blotting paper distributers in a lamp of standard size, as that number of distributers controls the gas pressure so as to assure a steady flame of maximum length without danger of such excessive pressure as will blow the flame away from the burner.

I have found by experiment that when three distributers are used the flame will be steady but relatively short, say about 3½ inches in length, but if another distributer be added the length of the flame will be increased to say 5 inches, and the flame will be steady and reliable. If still another distributer be added the excessive gas pressure in the lamp will blow out the flame at the burner tip.

The flame-protector 19 is preferably of the form shown in Figs. 1 and 6, and has a sleeve 20 adapted to turn on the tube 10ª as indicated by dotted lines in Fig. 6 to change the position of the protector relative to the flame, to suit different conditions of use.

The reservoir 1 has an opening 1ª through which water may be poured into the reservoir. A perforated screw cap 21 closes the opening 1ª.

A hook 22 on the reservoir 1 serves as a handle and also serves to connect the lamp with the cap or clothing of the user.

Having fully described my invention, what I claim as new and desire to secure by Letters Patent is:

1. In an acetylene lamp, the combination of a horizontally disposed water reservoir having a transverse diaphragm provided with an opening through the lower part of the diaphragm; a carbid box coaxial with the water reservoir and having gas-light connection therewith; a drum transverse to the diaphragm and closed at one end and having its open end in communication with the carbid box above the mass of carbid contained in the box; a filter in said drum; a series of fibrous distributers contacting with each other, one distributer being in contact with the diaphragm of the water reservoir and another distributer being in contact with substantially the entire area of one end of the mass of carbid partially filling the carbid box; a gas-supply tube in communication with said drum; a branch tube in communication with the gas-supply tube; a removable closure below the juncture of the branch tube with the gas-supply tube; a burner at the upper end of the branch tube, and a fibrous barrier in the branch tube and adjacent to the inner end of the burner.

2. In an acetylene lamp, the combination of a horizontally disposed water reservoir open to the atmosphere and provided with a transverse wall having an upper opening adapted to accommodate a drum and a lower opening for the discharge of water; a carbid box co-axial with the water reservoir; capillary distributers positioned to control the flow of water through the lower opening in said wall and diffuse same on the entire area of one end of the mass of carbid; a drum mounted in the upper opening of said wall; a filter in said drum; a drainage tube in communication with said drum, a branch tube in communication with said drainage tube; a burner tip mounted on the branch tube; and a fibrous barrier in said branch tube, below and adjacent to the burner tip.

In witness whereof I have hereunto signed my name at Springfield, Illinois, this fourteenth day of July, 1913.

FRANK GUY.

Witnesses:
Geo. R. Shanklin,
S. Allynn Troxell.

Copies of this patent may be obtained for five cents each, by addressing the "Commissioner of Patents, Washington, D. C."

Correction in Letters Patent No. 1,199,267.

It is hereby certified that in Letters Patent No. 1,199,267, granted September 26, 1916, upon the application of Frank Guy, of Springfield, Illinois, for an improvement in "Acetylene-Lamps," an error appears in the printed specification requiring correction as follows: Page 2, line 113, claim 1, for the compound word "gas-light" read *gas-tight;* and that the said Letters Patent should be read with this correction therein that the same may conform to the record of the case in the Patent Office.

Signed and sealed this 24th day of October, A. D., 1916.

[SEAL.]

F. W. H. CLAY,
*Acting Commissioner of Patents.*